United States Patent [19]
Ott et al.

[11] 4,388,185
[45] Jun. 14, 1983

[54] ELECTRIC OIL REFINER

[76] Inventors: Norman Ott; Jeanette O. McKeachern, both of 6140 SW. 84th Ave., Miami, Fla. 33143

[21] Appl. No.: 371,616

[22] Filed: Apr. 26, 1982

[51] Int. Cl.³ .......................... B01D 3/28; B01D 27/08
[52] U.S. Cl. ................................... 210/136; 210/168; 210/180; 210/184; 196/46.1; 196/115; 123/196 A
[58] Field of Search ................. 210/97, 136, 168, 180, 210/184, 232, 238, 436; 196/46.1, 115; 123/196 A

[56] References Cited

U.S. PATENT DOCUMENTS

| | | | |
|---|---|---|---|
| 4,006,084 | 2/1977 | Priest | 210/180 |
| 4,289,583 | 9/1981 | Engel | 210/180 |
| 4,304,663 | 12/1981 | Manders | 210/180 |

*Primary Examiner*—Ernest G. Therkorn

[57] ABSTRACT

For an engine to be operated under oil pressure, an oil refiner composed of a cylindrical housing having a lid and a heater means arranged in the upper portion of the housing and a plurality of radially extending fins adapted to be heated by said heater means and a plate and filter means in the housing to filter oil traveling through the device and to heat it and wherein the device includes a one-way check valve means so that oil is always present in the device for quick response upon ignition of the vehicle.

5 Claims, 2 Drawing Figures

ELECTRIC OIL REFINER

FIELD OF THE INVENTION

This invention relates to an oil refiner for use on an internal combustion engine which includes an electrically operated immersion-type heater.

BACKGROUND OF THE INVENTION

In the past there have been continuing efforts to provide heat for engine oil and improved filtering to remove objectional impurities. This invention is an improved device which provides an electrically heated oil refiner for use on an internal combustion engine.

Representative prior patents are U.S. Pat. No. 4,006,084 for an Oil Reclaiming Device, and U.S. Pat. No. 4,289,583, also for an Oil Reclaiming Device. In the past such devices have been typified by a housing and a heater means arranged in the housing through which the engine oil must pass which also includes a filtering medium or bed. This invention is of an improvement in such oil reclaiming devices. It includes a novel lid wherein a plurality of spaced radially extending fins extend from a central oil well defining structure, toward, but not to, the walls of a mating housing. The lower ends of the fins and the central oil well defining structure are in abutting heat exchanging relation with a horizontal plate or septum spanning the housing. The plate has vertical passageways or orifices through which the oil flows in operation. The plate rests on a felt pad which in turn rests on a bed of filter material in the lower portion of the housing beneath the plate.

In the preferred embodiment, a check valve means is provided within the housing and the oil pump so that the oil remains in the housing at all times as is set forth and described more fully hereinafter. A heater for the lid in the housing is arranged in the central oil well defining structure; and a normally open pressure operated switch is provided in series with the heater to energize the heater in response to ignition to cause the oil in the housing to become heated promptly.

OBJECTS OF THIS INVENTION

It is a general object of this invention to provide an electric oil refiner of the type described more fully hereinafter which, in addition to relieving engine pollution vapors and reducing exhaust pollution, permits no changes of oil with the result of improved gas mileage and of cutting oil comsumption. The refiner also comprises a filter to clean contaminants and sludge from the engine to improve engine performance; in the device the oil is maintained at a preselected favorable temperature, preferably of about 190° F. to 195° F. so that contaminants are removed by evaporation from the oil system, the vapor being conducted to the valve cover or through an alternate path to the carburetor air filter cover so that, on the whole, an engine provided with this device is more efficient and uses less oil, performing better, because contaminants are removed from the combustion material and the oil. The engine customarily will be of the 12 or 24 volt type; however, other types may be utilized.

DESCRIPTION OF A PREFERRED EMBODIMENT

Figure 1:
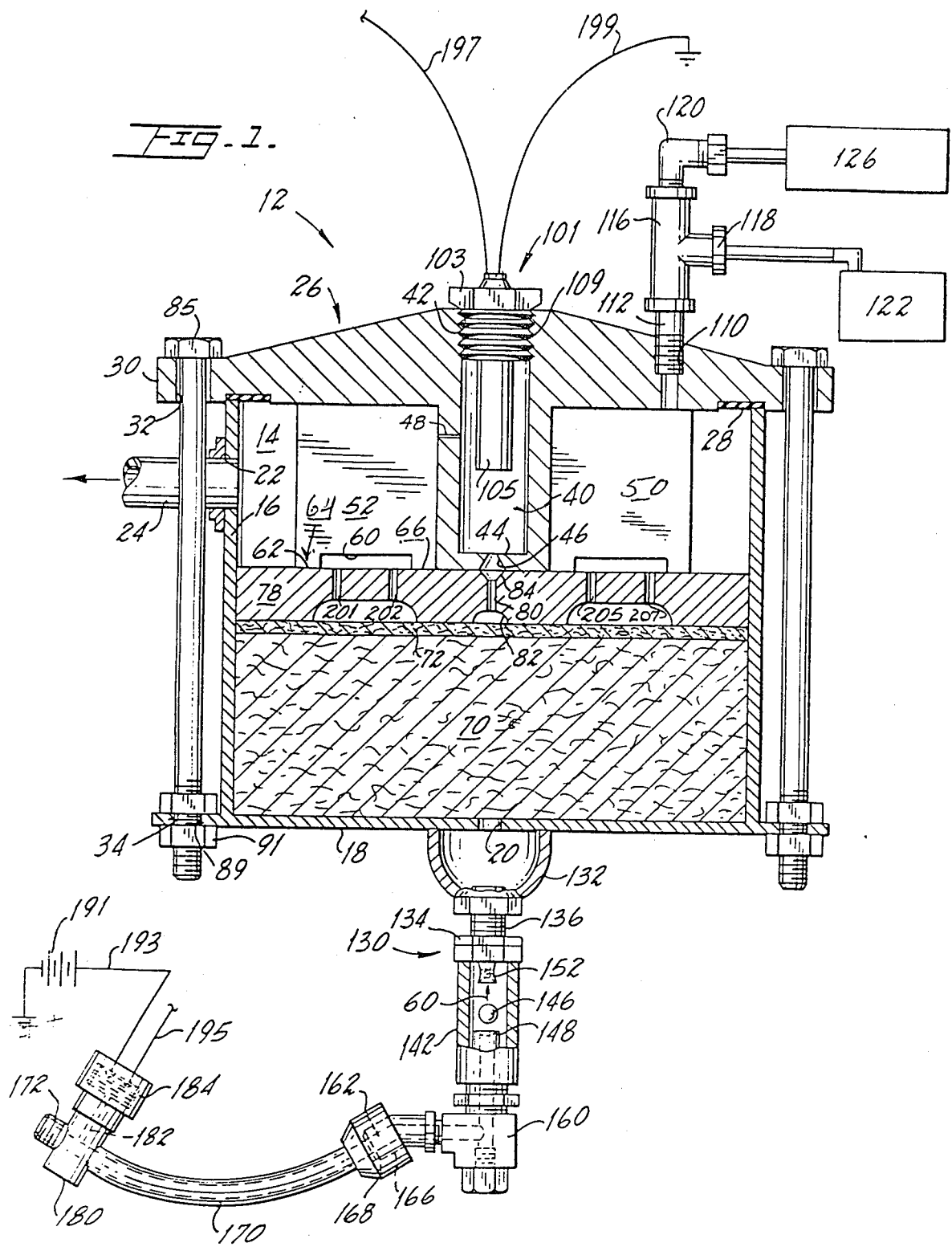
FIG. 1 is a view in cross section of the oil refiner with associated apparatus being schematically illustrated.

The oil refiner is generally designated by the numeral 12. It is composed of a housing 14 having a generally cylindrical vertical side wall 16 spanned at the lower end by a bottom 18 with an opening 20 centrally arranged in it. The side wall has a side opening 22 adjacent to the upper end of the housing which may be internally threaded and to which there is connected a hose 24 comprising an oil return to the oil pan of the engine, not shown. The hose 24 is connected to the engine oil pan at a level above the normal oil level in the oil pan.

Figure 2:
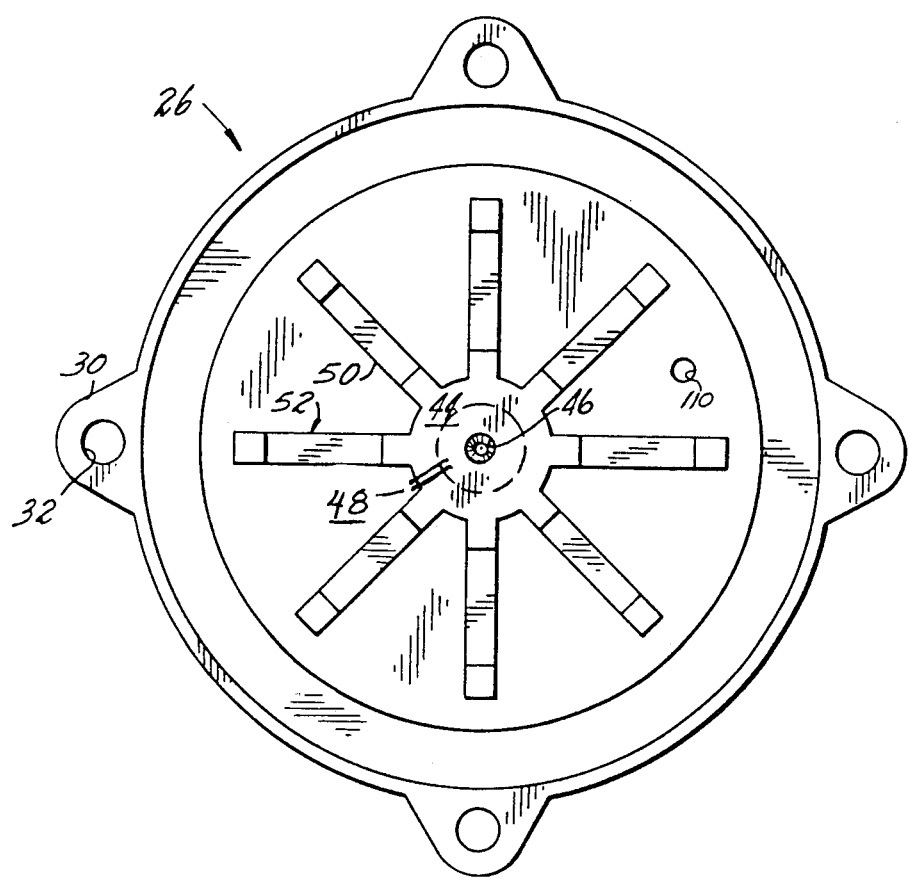
FIG. 2 is a bottom plan view of the lid of the refiner.

A lid 26 is provided to close the open end of the housing. The lid 26 as best seen in FIG. 2, is provided with a recess gasket 28 and radially or outwardly extending flanges, such as that designated by the numeral 30, which is provided with holes 32 therethrough which, upon reference to FIG. 1, is adapted to receive a headed bolt 85 which connects the lid to the housing. The bolt as shown extends through the hole 89 in the flange 34 of the bottom 18 of the housing for the purpose of securing the lid in closing relation of the housing with the upper end of the lid being in engagement with the recessed gasket 28. The lid carries a depending central oil well defining structure 40. This structure 40 extends below a central threaded opening 42 of the lid. The lower end of the oil well defining structure 40 is closed by a bottom 44, with an orifice 46, in the center, so that oil may enter it. The oil well defining structure 40 also has an outflow orifice 48 adjacent to the upper end thereof. As also seen in FIG. 2, the lid is provided with radially extending spaced fins such as 50 and 52 which extend outwardly from the oil well defining structure 40 toward but not to the housing. Each of the fins, such as that designated by the numeral 50 and 52 in FIG. 1, is of a predetermined height equal to the height of the oil well defining structure and each of the fins has a lower end 62 provided with an upwardly extending cutout, such as that designated by the numeral 60. This defines a pair of spaced feet 64 and 66.

With respect to the housing proper, on the housing floor 18, there is provided a bed 70 of waste material, such as threads in a tangled mass, to serve as a filter. In spanning relation of the upper surface of this bed, there is provided a felt pad 72. Between the extending lower ends of the fins and the oil well defining structure, on the one hand, and the felt pad, on the other hand, there is provided a diffuser plate 78.

This diffuser plate has a central through orifice 80, which is preferably about 3/32 inch in diameter, and the orifice is enlarged at its ends to provide a flared opening at the bottom 82 confronting the pad 72 and a flared opening 84 in the top surface communicating with the orifice 46 in the bottom 44 of the oil well defining structure of the lid. In assembly, the lid is fitted to the housing and the headed bolts, such as that indicated by the numeral 85, are passed through the holes 32 and 89 and each bolt is secured by a nut as at 91, see FIG. 1. This assembly takes place after the inner parts are assembled. The plate 78 spans the housing and separates it into two chambers. This plate is in abutting engagement with the lower ends of the fins and the oil well defining structure in the upper chamber and rests on the felt pad 72 on the top of the filter bed 70 in the lower chamber.

Within the oil well defining structure a heater means 101 is adapted to be positioned. In the disclosed embodiment, a threaded plug 103 is provided from which a generally cylindrically shaped heater element of the immersion-type is provided in depending relation so that when the plug 103 is in threaded engagement with the central opening of the lid as by the threads 109, the heater is centrally arranged within the oil well defining structure in spaced relation from the side wall 40 and the bottom 44.

At this juncture, it is pointed out that in the lid there is another opening 110, see at the upper right of FIG. 1. In this opening 110 and in threaded engagement therewith, is the nipple end 112 of a T member 116 which has a first connecting branch or conduit 118 and, in spaced relation therefrom, a second connecting conduit or branch 120. The first conduit 118 is in open communication with the valve cover 122 of the engine which is shown schematically. The other conduit 120 is connected to the carburetor filter cover 126 which is also shown schematically. Referring now to the bottom 18 of the housing, there is a check valve 130 in threaded engagement with the floor or bottom 18 of the housing. Preferably the check valve is in open communication with a depending dirt collecting structure or sump 132. Suitable means, such as the bolt 134 on a nipple 136 in threaded engagement as shown, interconnect the one-way check valve 130 to the housing. The check valve includes a cylindrical portion 142 with a ball 146 normally in closing relation of an orifice 148; however, in response to the oil pressure, the ball is lifted vertically upwardly in the direction of the arrowed line 60. Desired is an openwork structure 152 provided to catch the ball so that it cannot close off the oil flow to the housing. To the lower end of the valve body there is provided a fitting 160 with an orifice intake 162 preferably of about 1/16 of an inch in diameter. It may include a nipple which is exteriorly threaded as at 166 for connection to a companionate fitting 168 on the end of a hose 170. The hose leads to the oil pump to which it is connected by a threaded end 172. On the hose 170 there is provided a T structure 180 with a side vent defining structure 182 to which there is connected a commercially available, normally open pressure operated switch for a purpose to be described hereinafter, the switch being designated by the numeral 184.

In operation, when there is pressure caused by the oil pump in the hose 170 at the T structure 180, the normally open pressure operated switch 184 will sense the pressure and since it is connected to the battery 191 through an electrical conductor means 193, it will permit energy to flow through an electrical conductor means 195 to the lead 197 of the immersion 105 heater through the lead 199 to ground. This results in heat promptly being available within the oil well defining structure of the electric oil refiner 12 whenever the oil is being pumped. The pressure in the hose 170 will also open the check valve 130 lifting the ball 146 to permit oil to flow through the valve body into the housing. In travel through the housing, the oil will pass, first through the waste material and pad and, then, through either the central orifice 80 into the heated oil well defining structure and through the other orifices in the plate 78 which are indicated by the numerals 201, 202, 205, and 207. These latter orifices are preferably about 1/16 in diameter. The result is that the upper portion of the housing, that is the portion above the plate 78, will receive oil about and between the fins, as well as in the oil well defining structure. The oil within the oil well defining structure, being closest to the immersion heater 105 will be heated as it flows upwardly and outwardly through the orifice 48 between the fins of the lid to return together with the oil which is passed through the orifices 201, 202, 205, and 207 through the opening 22 to the oil pan of the engine through conduit 24. The contaminates in the oil will be vaporized and escape through the opening 110 and fitting 112, some traveling through the conduit 118 to the valve cover 122 and some traveling through the conduit 120 to the carburetor air filter cover 126.

It is thus seen that there is provided a compact apparatus which is adapted to be readily installed upon an existing engine between the oil pump and the oil return line and which is also provided with a heater means, which is normally energized when there is oil pressure by reason of the normally open pressure operated electrical switch 184, and wherein means are provided connecting the upper heated chamber of the refiner to the valve cover in one conduit and to the carburetor filter cover in a second conduit, so that the engine is promptly provided with heated oil in response to initial start-up and wherein, when the engine is turned off, oil will not be permitted by reason of the check valve previously described to leave the oil refiner housing and therefore there will be a prompt response in the form of flowing warm oil through the engine when started. In the preferred embodiment, the normally pressure operated electrical switch in response to 10 pounds of oil pressure, so as to immediately provide heat to the immersion-type heater.

While the instant invention has been shown and described in what is considered to be a practical and preferred embodiment, it is recognized that departures may be made within the spirit and scope of this invention which is therefore not to be limited except as set forth in the claims which follow.

What is claimed is:

1. For an engine to be operated under oil pressure, an oil refiner comprising, an open top housing of a first predetermined diameter, said housing having generally tubular walls, a floor spanning the housing bottom, said housing having a side opening adjacent the open top and a central opening through said floor, lid means sized to span the open end of the housing and means to secure the lid in closing relation of the housing, said lid having (a) a depending central oil well defining structure of a predetermined height and (b) a plurality of depending radially extending fins extending from the oil well defining structure and each of the fins being of a common radial dimension less than that of said predetermined diameter and of a common predetermined vertical height equal to that of the height of the oil well defining structure, each fin having a lower end surface and radially facing surfaces, said radially facing surfaces being in spaced relation from said housing, said oil well defining structure having a floor with a central through orifice therethrough a radially facing opening adjacent, said lid in open communication with the interior of said housing, the lower end surface of said fins having a cutout therein providing a radially distally located foot on each fin and a portion adjacent to the oil well defining structure comprising a proximal foot on each fin, a plate having a plurality of apertures therethrough and a central orifice in spanning relation of said housing and in abutting engagement with said fins and said oil well defining structure, and a bed of waste material in the housing on the floor and beneath the plate, a felt pad on the waste material and beneath the plate, said bed and said felt pad supporting said plate, said bolts means to hold the lid in closing relation of the housing maintaining said fins and plate in abutting relation, a heater means in said oil well defining structure and supported in spaced relation from said oil well defining structure and the bottom of said oil well defining structure, said heater means being adapted to be operatively connected to the electrical system of a vehicle upon which the oil refiner is installed, a one-way check valve means in open communication with the opening in the floor of said valve and conduit means to interconnect the check valve means to the oil pump of the engine, a normally open pressure operated switch in said conduit means responsive to pressure caused by an oil pump in the conduit to energize the heater means.

2. The device as set forth in claim 1 wherein said lid is provided with a through opening and conduit means connecting said opening to the valve cover and to the carburetor filter cover.

3. The device as set forth in claim 2 wherein said heater means is suspended in said oil well defining structure by means of a threaded plug and electrical connection means are provided through said plug to energize said heater.

4. The device as set forth in claim 1 wherein said means to secure the lid in closing relation of the housing comprises flanges extending radially from said floor and flanges radially extending from said lid and the bolts extending through openings provided in said lid flanges and floor flanges in registry one with one another and nut means in threaded engagement of said bolts to secure the lid to said housing.

5. The device as set forth in claim 1 wherein an annular gasket means is provided between said lid and said housing tubular walls.

* * * * *